United States Patent [19]

Sevier et al.

[11] Patent Number: 5,729,394
[45] Date of Patent: Mar. 17, 1998

[54] MULTI-DIRECTION OPTICAL DATA PORT

[75] Inventors: Richard G. Sevier, Boise; Eric L. Andersen, Meridian, both of Id.

[73] Assignee: Hewlett-Packard Company, Palo Alto, Calif.

[21] Appl. No.: 590,537

[22] Filed: Jan. 24, 1996

[51] Int. Cl.[6] .............................. G02B 7/00; G02B 7/182
[52] U.S. Cl. ................................. 359/726; 359/871
[58] Field of Search ............................ 359/726, 871, 359/872; 362/282; 355/46, 228

[56] References Cited

U.S. PATENT DOCUMENTS

| | | | |
|---|---|---|---|
| 4,405,219 | 9/1983 | Yosuda et al. | 353/37 |
| 5,006,886 | 4/1991 | Suzuki | 355/46 |
| 5,455,644 | 10/1995 | Yazawa et al. | 351/206 |
| 5,553,172 | 9/1996 | Kimura et al. | 382/312 |

*Primary Examiner*—David C. Nelms
*Assistant Examiner*—Jordan M. Schwartz

[57] ABSTRACT

A mirror and lens assembly which selectively places a mirror or other reflective surface into or out of the light path of an optical transducer in an optical data port to redirect incoming and/or outgoing optical signals and thereby permit data transfer from more than one general direction or position.

12 Claims, 8 Drawing Sheets

1

MULTI-DIRECTION OPTICAL DATA PORT

BACKGROUND OF THE INVENTION

1. Technical Field

This invention generally relates to optical data communications without the aid of a waveguide, such as a fiber optic cable, and more particularly, this invention relates to a device which enables optical data transfer, typically infrared, from more than one angle or perspective.

2. Background Art

The advent of portable electronic devices, especially portable personal computers, such as laptops, notebooks and the like, has spurred a desire to transfer data from one device to another without having to physically connect the two devices. One example of this is printing a document to a printer from a notebook type computer. In the past, this could only be accomplished by attaching a cable between a serial or parallel port on the computer and a serial or parallel port on the printer. To eliminate this problem, manufacturers have turned to infra-red (IR) data transfer wherein each device is provided with an infra-red data port, which often include both an infra-red source and an infra-red detector or receiver.

One of the drawbacks to the current state of the art is that the "field of view" of the infra-red transducers is limited to approximately 30°, i.e. 15° on both sides of the axis. This places limitations on where the user can position the devices since the data ports must more or less line up. For instance, if the notebook computer's IR port is located on the back panel of the computer and the printer's IR port is located on the front panel of the printer, the computer must be placed generally in front of the printer to complete the data transfer. This can be a problem if there isn't enough available space on the table or desktop in front of the printer.

An additional problem which is present in some electronic device designs is a consequence of the limited available space within the electronic device itself. For instance, in most laser printers the majority of the width of the printer is utilized by the print engine and paper transport mechanism leaving little room for supporting electronics. Consequently, the circuit boards are often mounted in a vertical plane within the housing parallel to and adjacent to the sides of the housing on one or both sides of the print engine. Attaching an IR transducer to this circuit board to allow data transfer to and from the front of the printer requires the transducer to be mounted on an "L" shaped bracket protruding out from the circuit board. This poses manufacturing problems in that both the transducer and the bracket must be precisely oriented and rigidly mounted to reduce potential failure and unacceptable performance.

What is needed is a IR port which is capable of sending and/or receiving data from more than one perspective or direction. It is therefore an object of this invention to satisfy this need. An additional object of this invention is to provide a multi-direction IR port which is easily and inexpensive retrofitable to existing electronic device designs and requires only minor modifications to the housing of the electronic device. A further object of this invention is to provide a design which allows the optical transducer to be mounted in the plane of the circuit board.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

DISCLOSURE OF THE INVENTION

These objects, as well as others, are realized by an optical data port and mirror and lens assembly which selectively places a mirror or other reflective surface into or out of the light path of the optical transducer to redirect incoming and/or outgoing optical signals and thereby permit data transfer from more than one general direction or position.

In one embodiment of the invention a two position lens and mirror assembly is positioned in the light path of an optical transducer. The lens and mirror assembly has a pair of panels, a lens panel and a side panel, joined together along a common edge to form an "L" shaped sub-assembly. A mirror panel extends from the inside surface of the side panel and has its reflective surface facing the inside surface of the lens panel. The mirror panels is positioned such that it does not interfere with the light path of the transducer in the first position, simply letting the light enter and exit through the lens. However, when the assembly is in its second position, the reflective surface of the mirror is placed directly in the light path and in so doing redirects the light path through the lens in its second position. In this manner, the user can select which of the two directions data transfer is desired.

Another embodiment of the invention has a movable mirror which is selectively positionable by means of a thumbwheel which provides for angular rotation of the movable mirror into and out of the light of the optical transducer module to redirect the light path through one or more supplemental lens and thereby accomplish data transfer from any one of two or more directions.

Yet another embodiment of the invention has a movable mirror mounted within a lens and mirror assembly, the lens and mirror assembly has top and bottom guides which interact with a stationary pin to selectively position the movable mirror in and out of the light path to redirect the light path through a supplemental lens and thereby accomplish data transfer from any one of two or more directions.

DETAILED DESCRIPTION OF THE INVENTION

Figure 1:
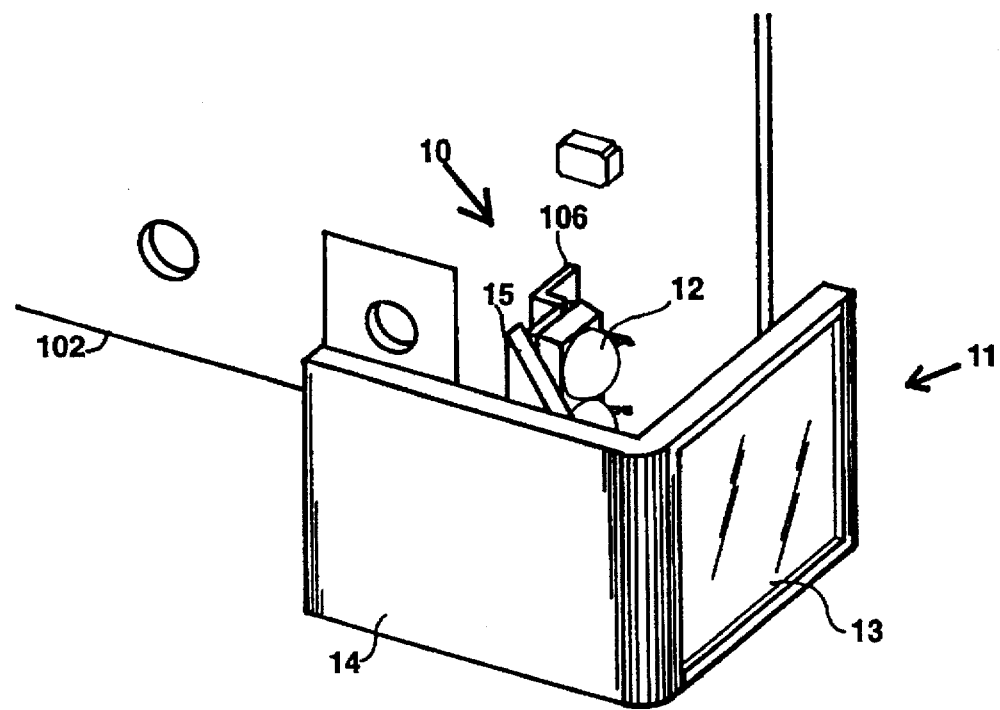
FIG. 1 is a perspective view of a two position lens and mirror assembly for an optical data port which allows data transfer from the front or side of an image forming device such as a laser printer with the lens positioned for front data transfer.
Figure 2:
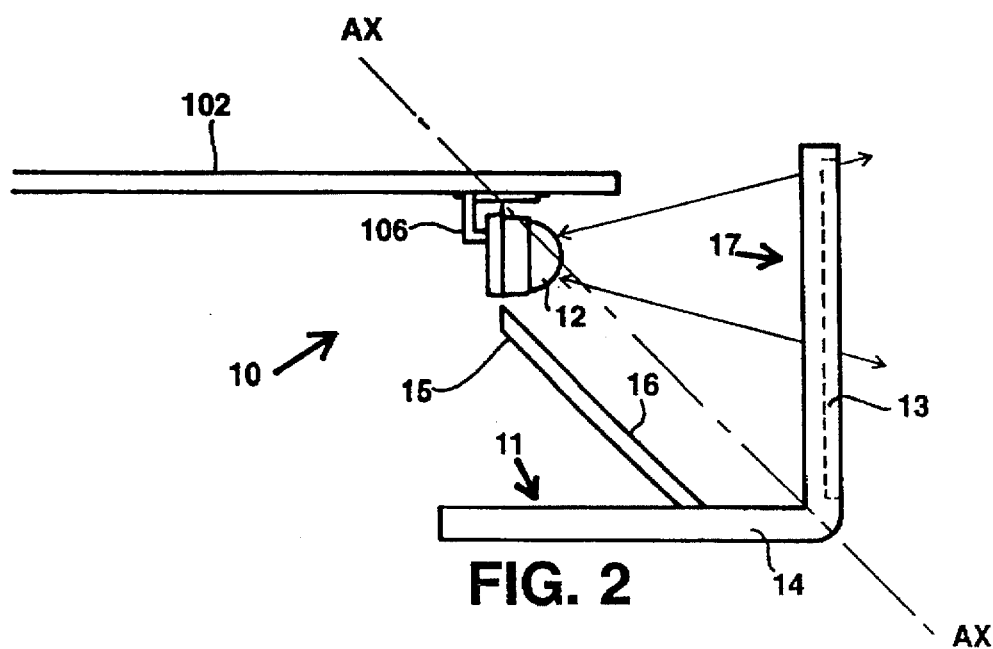
FIG. 2 is a top view of the lens and mirror assembly of FIG. 1.
Figure 3:
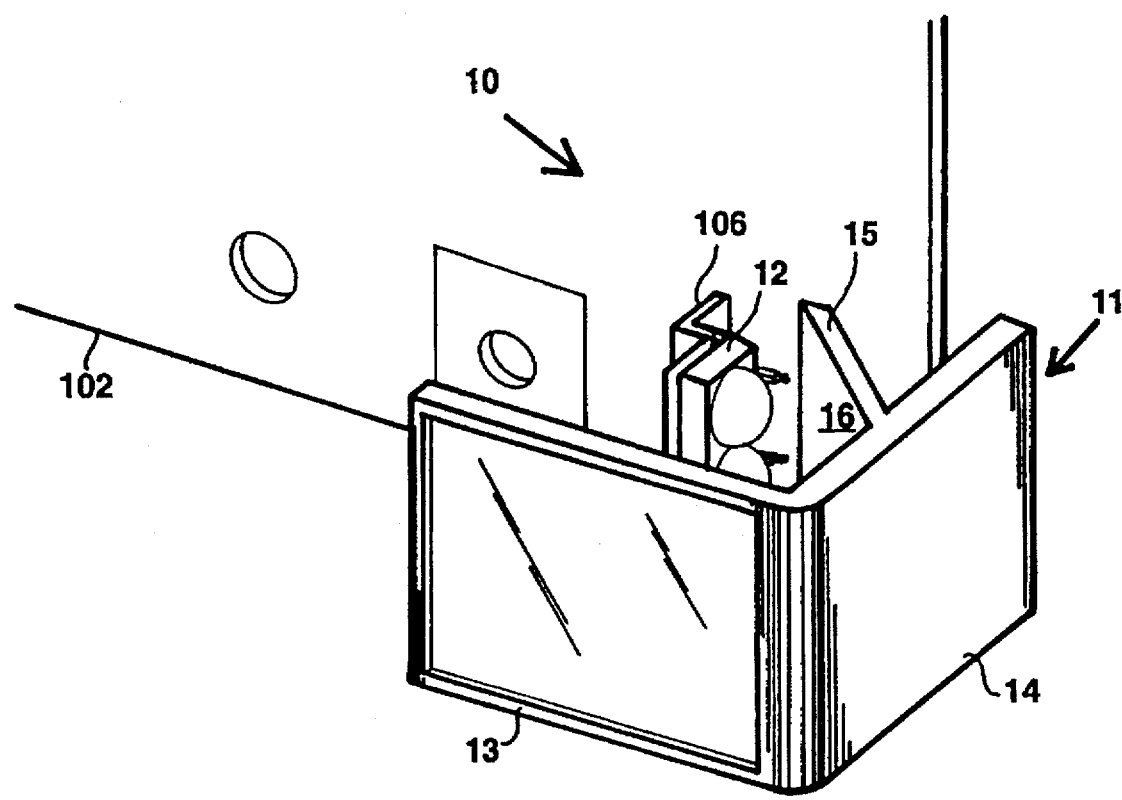
FIG. 3 is a perspective view of a two position lens and mirror assembly for an optical data port which allows data transfer from the front or side of an image forming device such as a laser printer with the lens positioned for side data transfer.
Figure 4:
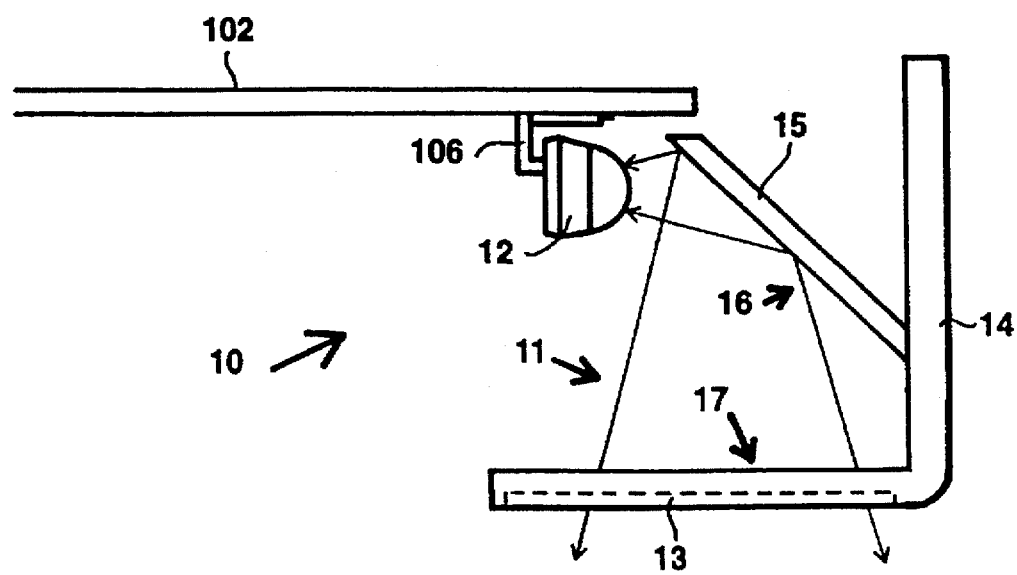
FIG. 4 is a top view of the lens and mirror assembly of FIG. 3.

Referring now to the figures, a multi-direction optical data port is shown and generally designated as 10 in the drawings. For the purposes of explanation, multi-direction optical data port 10 is described here in conjunction with an image forming device 100, such as a laser printer, having a circuit board 102 vertically mounted within housing 103 of image forming device 100 adjacent one of its sides. However, it should be noted that invention is not limited to this configuration or layout and may be incorporated into a multitude of electronic devices utilizing optical data transfer, particularly infra-red coupling.

Figure 12:
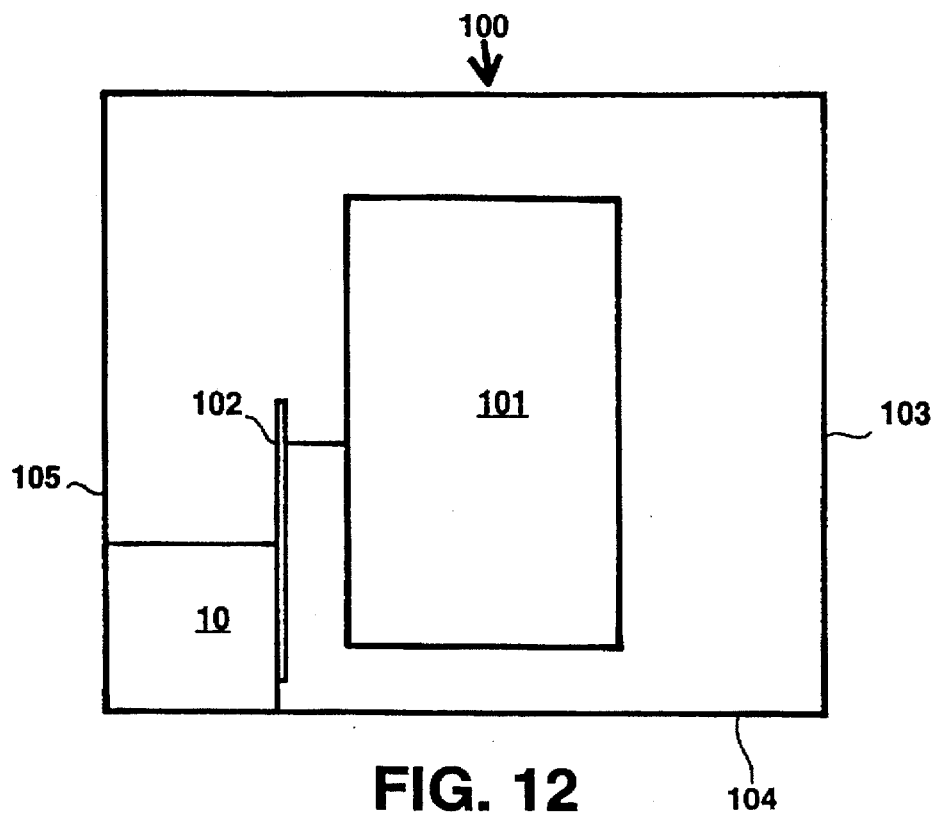
FIG. 12 is a block diagram of an image forming device incorporating a multi-directional optical data port.
Figure 13:
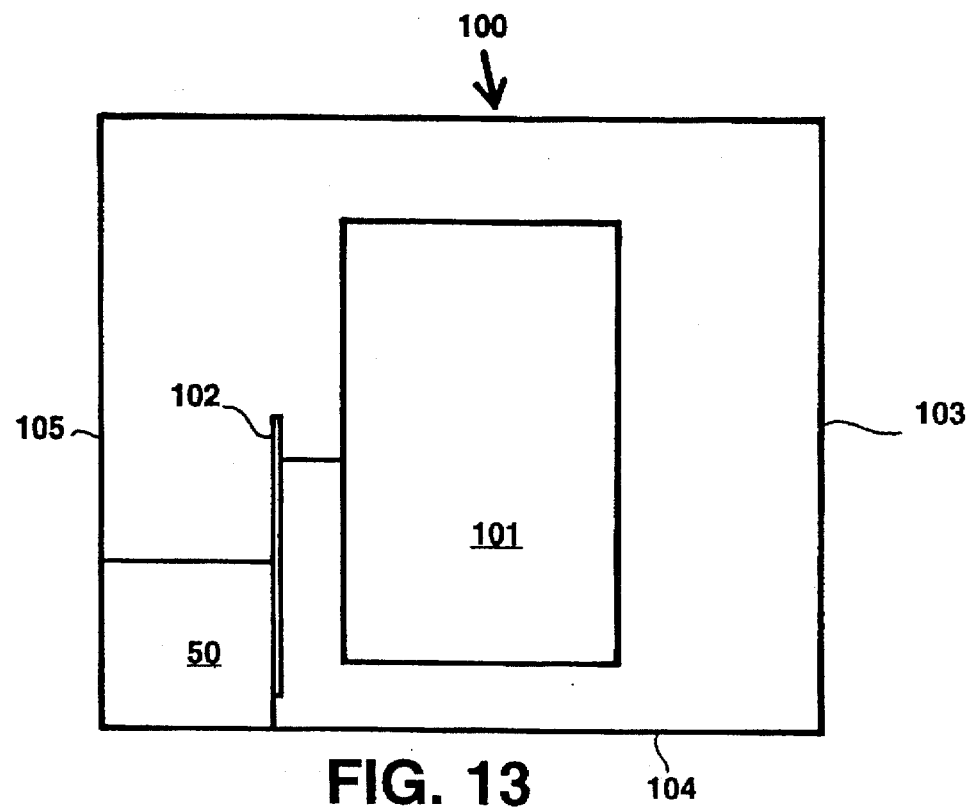
FIG. 13 is a block diagram of an image forming device incorporating a multi-directional optical data port.

A first configuration of a first embodiment of multi-direction optical data port 10 is shown in FIGS. 1–4, with additional references being made to FIG. 12. Multi-direction optical data port 10 here has a lens and mirror assembly 11 fixed in front of an optical transducer module 12. Optical transducer module 12 is, in this embodiment, a serial infra-red (SIR) device for receiving and emitting infra-red signals and is mounted on an "L" shaped bracket 106, to thereby position optical transducer module 12 facing the front side 104 of housing 103 to enable optical data transfer from the front of image forming device 100.

Lens and mirror assembly 11 has a pair of identically dimensioned panels, lens panel 13 and side panel 14, joined along a common edge to form an "L" shaped lens assembly. Panels 13 and 14 are dimensioned and joined so that they are symmetrical about an axis, designated as axis of symmetry, AX, in FIG. 2. The angle at which the panels are joined is determined by the angle at which the adjacent sides of housing 103 meet, here front 104 and side 105. Here this angle is equal to 90°. However, it should be noted that other housing designs could employ different angles and the lens assembly is configured accordingly. A mirror panel 15 depends angularly from the interior surface of side panel 14 at a point behind axis AX so as not to interfere with the light path when the lens assembly is in its front data transfer position, shown in FIGS. 1 and 2.

Mirror panel 15 has a reflective surface 16, which is preferably a front silvered mirror, facing the interior surface 17 of lens panel 13. The selection of the mirrored surface itself and incident angle depends on the particular wavelength used for data transfer to provide optimum reflectance. The angle between lens panel 13 and reflective surface 16 is such that light transmitted by lens 13 is reflected into optical transducer module 12 and light emitted by optical transducer module 12 is reflected through lens 13 when lens and mirror assembly 11 is in its side data transfer position, shown in FIGS. 3 and 4. It should now be apparent, fortified with the knowledge that the angle of incidence is equal to the angle of reflection, that the angle of mirror panel 15, with respect to lens panel 13, is dependent upon the position of lens panel 13 and the orientation of optical transducer module 12. Here, the angle between mirror panel 15 and lens panel 13 is 45°.

Figure 5:
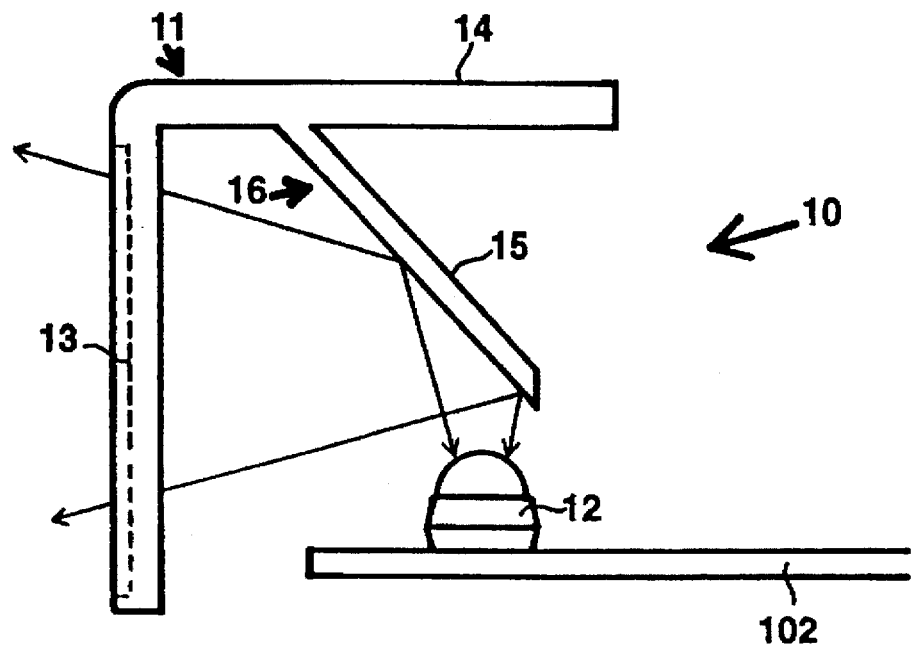
FIG. 5 is top view of a lens and mirror assembly which allows data transfer from the front or side of an image forming device and which enables mounting of the optical transducer module directly to the circuit board with the lens in the front data transfer position.
Figure 6:
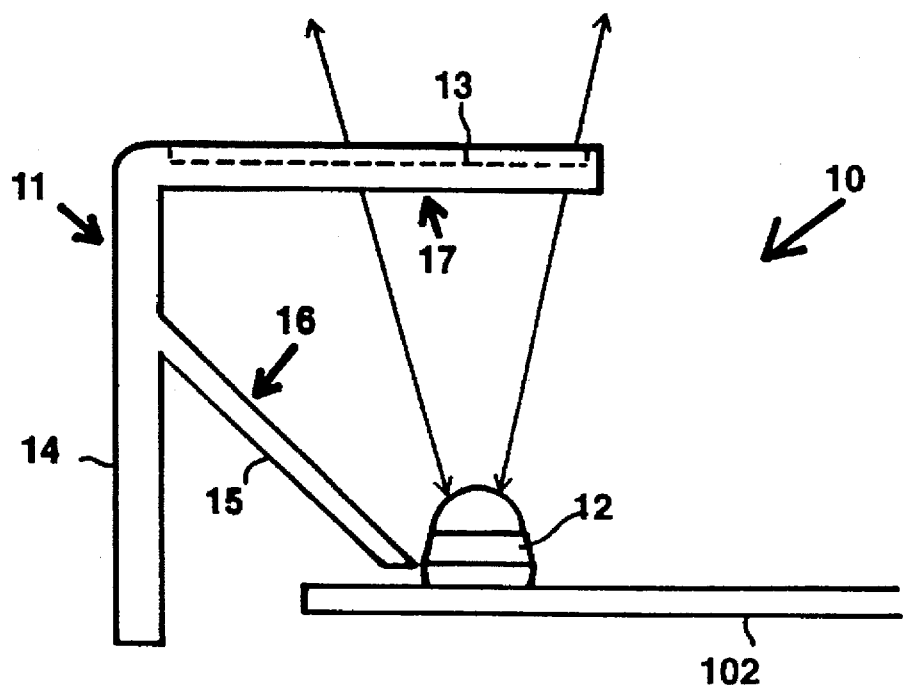
FIG. 6 is a top view of the lens and mirror assembly of FIG. 5 with the lens in the side data transfer position.

A second configuration of the first embodiment is shown in FIGS. 5 and 6. This configuration facilitates surface mounting of optical transducer module 12 and thereby eliminates the need for the "L" shaped mounting bracket. Lens and mirror assembly 11 remains unchanged. The primary difference between the first and second configurations is that in the second configuration optical data signals are reflected in the front data transfer position, shown in FIG. 5, and not the side data transfer position, shown in FIG. 6.

In both the first and second configurations, lens and mirror assembly 11 is attached in a hole in housing 103 using a suitable attachment means such as a friction fit, a mechanical or magnetic latch, a spring detent mechanism, etc. To switch between data transfer directions, here the front and side directions, lens and mirror assembly 11 is removed from housing 103, rotated 180° about the axis of symmetry AX and re-inserted into housing 103.

Figure 7:
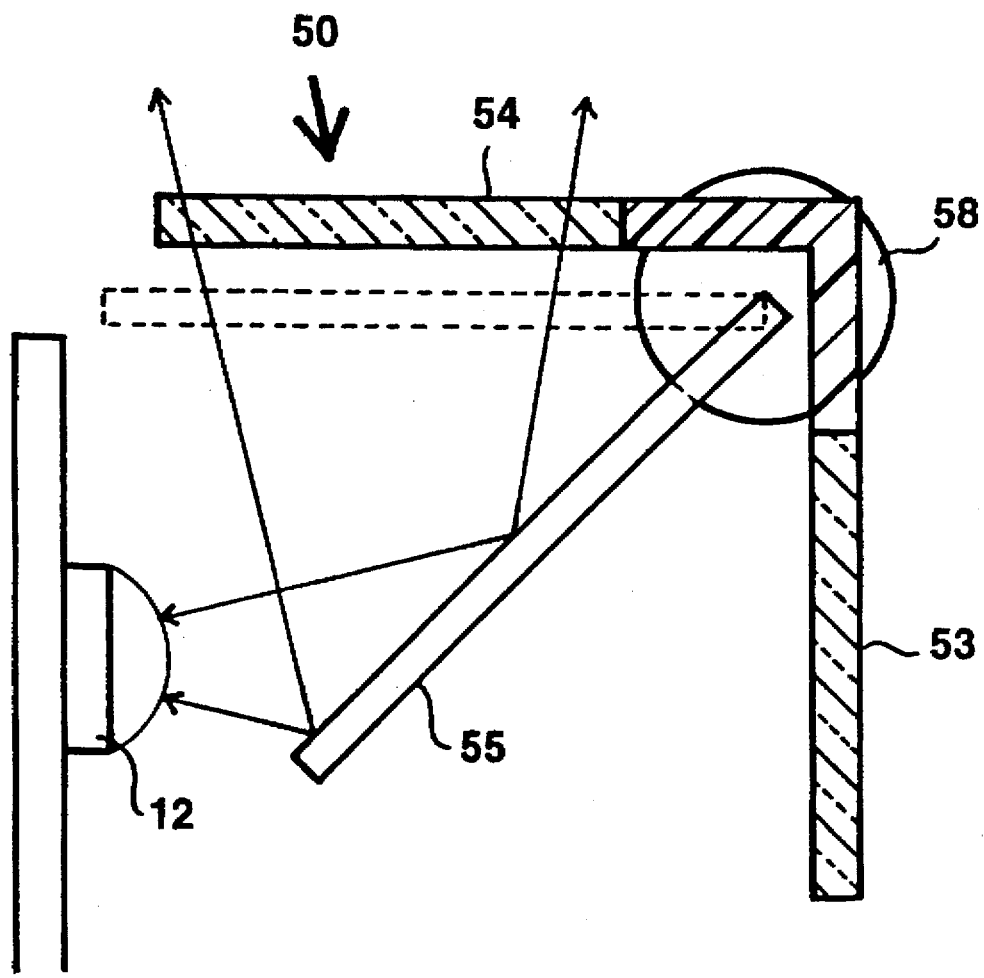
FIG. 7 is a top view of a second embodiment according to the invention having a lens and mirror assembly which has a movable mirror enabling multi-direction optical data transfer.
Figure 9:
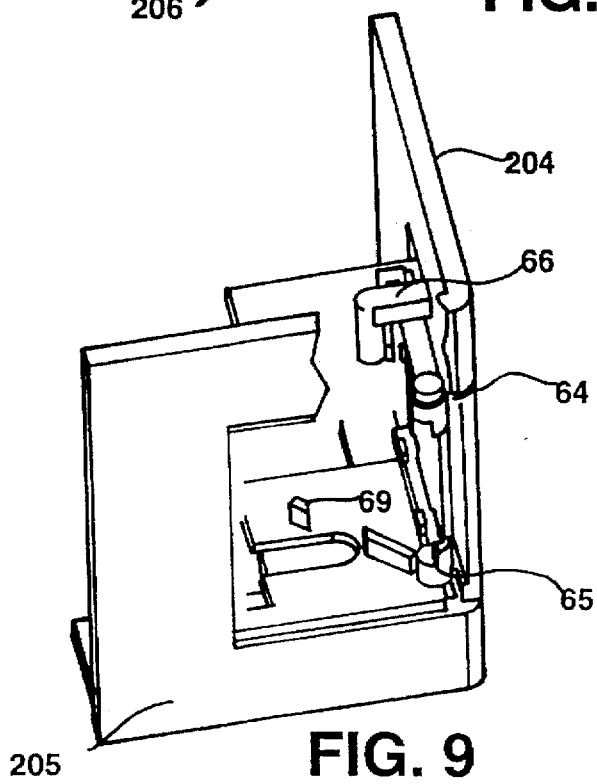
FIG. 9 is a is a cutaway perspective view of a third embodiment according to the invention having a lens and mirror assembly which has a movable mirror enabling multi-direction optical data transfer.

A second embodiment of optical data port, designated as 50, is shown in FIG. 7, with additional references made to FIG. 9. This embodiment uses a pair of lens panels 53 and 54 which alternatively may be attached one to the other similar to the first embodiment and in any event are positioned in an angular relationship, one to the other, proximate optical transducer module 12. Here lens panel 54 is positioned within the front 104 of housing 103 directly in the light path of optical transducer module 12. Lens 53 is positioned within the side 105 of housing 103 at a second position from which data transfer is desired. A movable mirror 55 is selectively positionable into and out of the light path of optical transducer module 12 to reflect light between lens 53 and optical transducer module 12 to complete lens and mirror assembly 51.

In this embodiment, mirror 55 pivots about a point proximate the intersection point of front 104 and side 105 of housing 103 along an axis parallel to the side edge of mirror 55. Mirror 55 is attached to a thumbwheel 58 along a portion of the lower side of mirror 55 adjacent the pivoting side edge. Consequently, an angular rotation of thumbwheel 58 will cause the opposite side edge to translate through an angle equal to the rotation of thumbwheel 58. In the configuration shown, the angle of rotation is limited to approximately 45° or less. An indicator can be attached to the exposed portion of thumbwheel 58 to give the user feedback as to the position of mirror 55. Additionally, a positive latching mechanism such as a detent bearing and cooperating recess is preferably employed to lock mirror 55 in and out of the light path of optical transducer 12.

Figure 14:
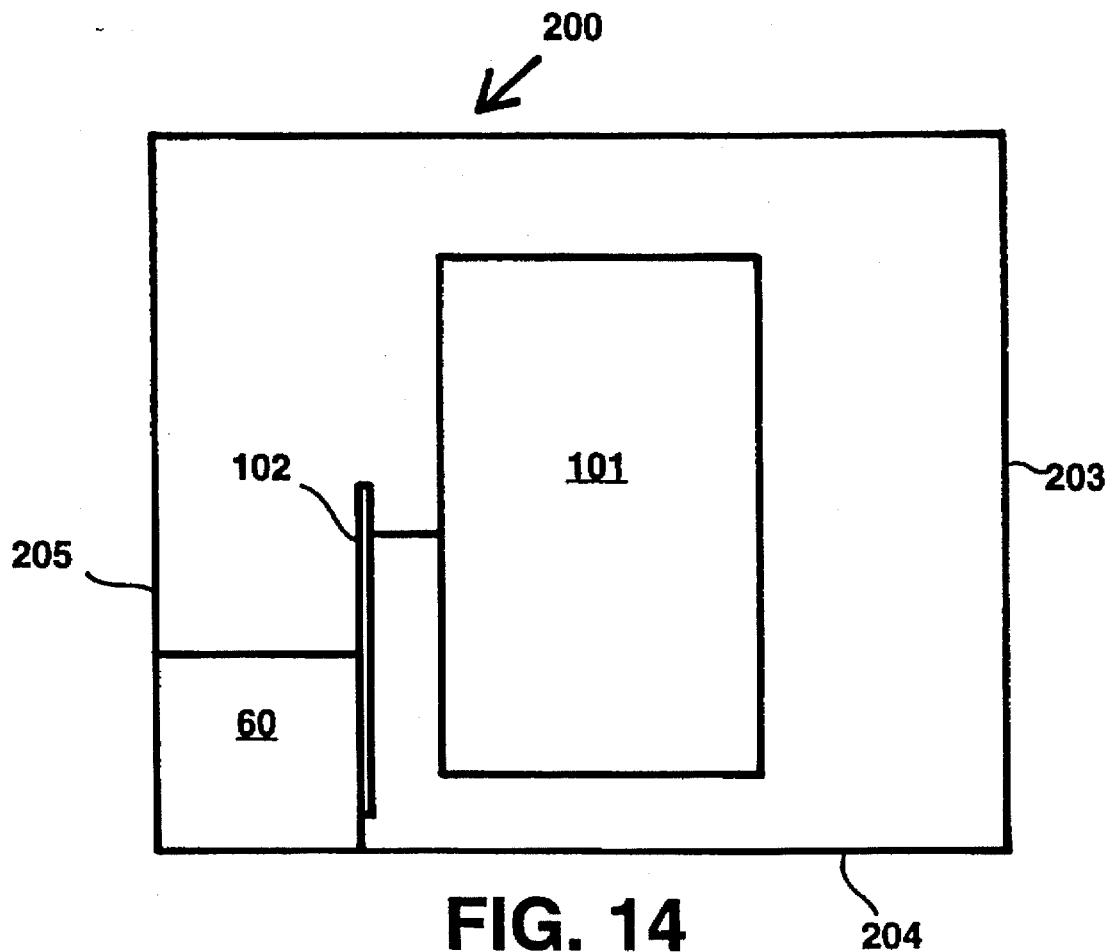
FIG. 14 is a block diagram of an image forming device incorporating a multi-directional optical data port.

A third embodiment of multi-direction optical data port 60 is shown in FIGS. 8–11, with additional references being made to FIG. 14. This embodiment is similar to the second configuration of the first embodiment in that it facilitates surface mounting of optical transducer module 12 and thereby eliminates the need for the "L" shaped mounting bracket. Optical transducer module 12 is, in this embodiment, a serial infra-red (SIR) device for receiving and emitting infra-red signals facing side 205 of housing 203 to enable optical data transfer from the side of image forming device 200. Multi-direction optional data port 60 here has a lens and mirror assembly 61 for removable positioning within opening 206 formed at the corner where the sides of housing 203 meet, here front 204 and side 205, in front of optical transducer module 12.

In this third embodiment, lens and mirror assembly 61 is attached in opening 206 of housing 203 using a suitable attachment means such as a friction fit, a mechanical or magnetic latch, a spring detent mechanism, or an indexing channel and tab. To switch between data transfer directions, here the front and side directions, lens and mirror assembly 61 is removed from housing 203, rotated 180° about the axis of symmetry AX and re-inserted into housing 203.

Lens and mirror assembly 61 has a pair of identically dimensioned panels, lens panel 73 and side panel 74, joined along a common edge to form an "L" shaped lens assembly. Panels 73 and 74 are dimensioned and joined so that they are symmetrical about an axis, designated as axis of symmetry, AX, in FIG. 8. The angle at which the panels are joined is determined by the angle at which the adjacent sides of housing 203 meet, here front 204 and side 205. Here this angle is equal to 90°. However, it should be noted that other housing designs could employ different angles and the lens assembly is configured accordingly.

Figure 8:
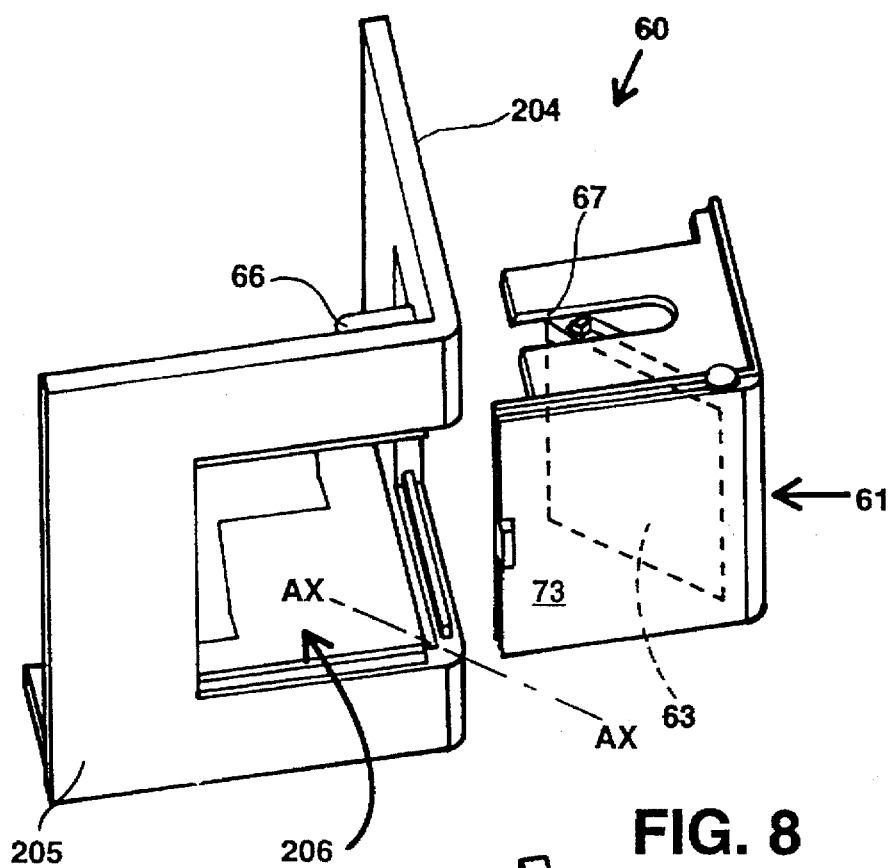
FIG. 8 is a is a perspective view of a third embodiment according to the invention having a lens and mirror assembly which has a movable mirror enabling multi-direction optical data transfer.
Figure 10:
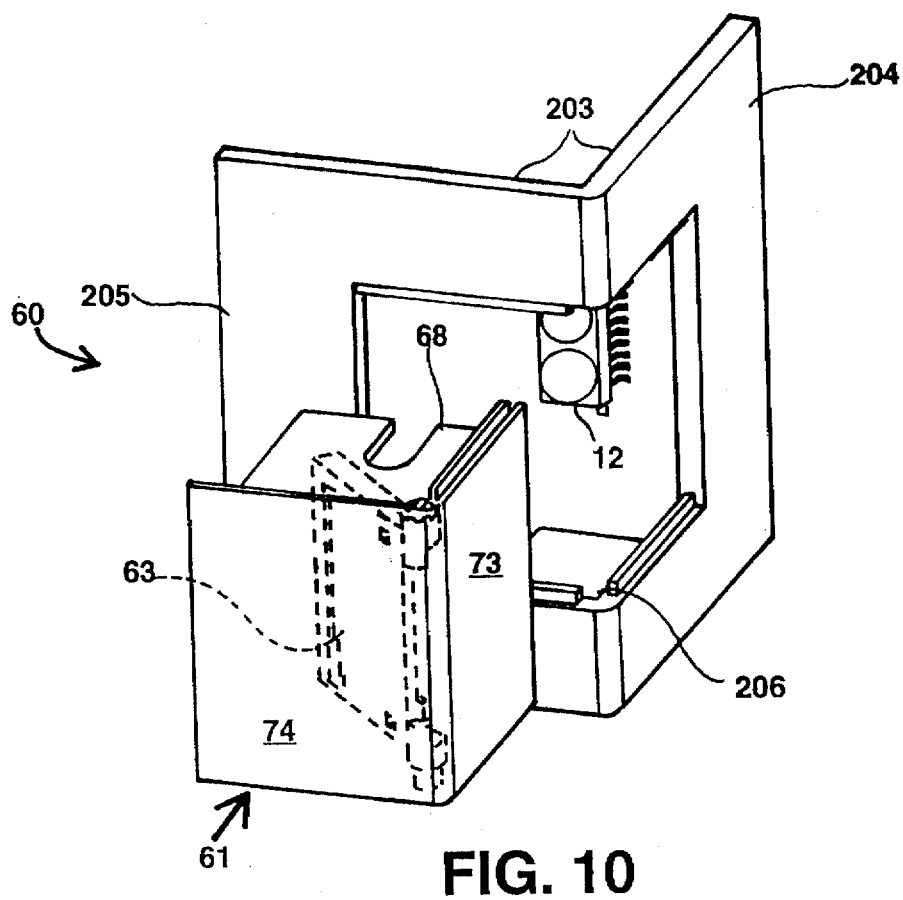
FIG. 10 is a is a perspective view of a third embodiment according to the invention having a lens and mirror assembly which has a movable mirror enabling multi-direction optical data transfer.
Figure 11:
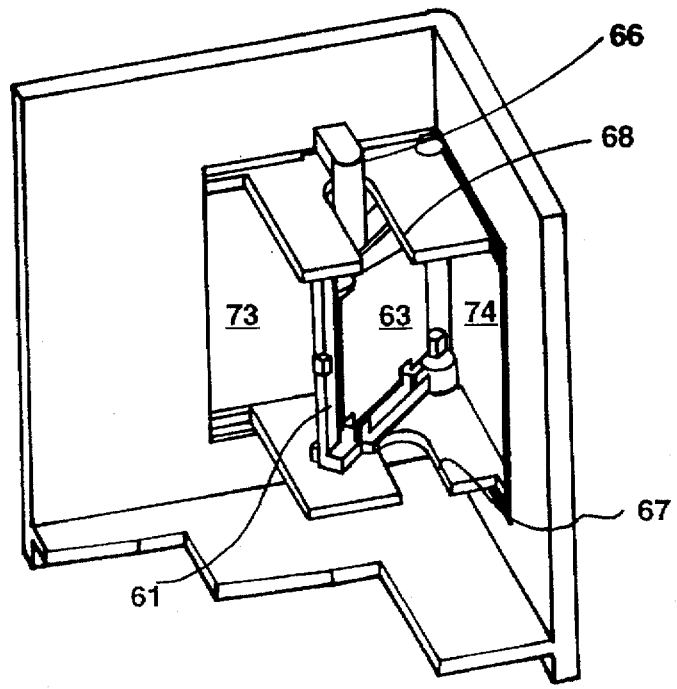
FIG. 11 is a is a cutaway perspective view of a third embodiment according to the invention having a lens and mirror assembly which has a movable mirror enabling multi-direction optical data transfer.

Lens and mirror assembly 61 has a mirror 63, side panel 74 and lens panel 73. Mirror 63 is pivotally supported within lens and mirror assembly 61 by top spring hinge 64 and bottom spring hinge 65 which are biased towards an open position as seen in FIGS. 8, 10 and 11. Mirror 63 pivots about a point proximate the intersection point of front 204 and side 205 of housing 203 along an axis parallel to the side edge of mirror 63. Front 204 is configured having stationary pin 66 mounted on the inside surface of front 204, the longitudinal axis of stationary pin 66 projecting vertically within opening 206 for slideable engagement with either lens and mirror assembly first guide 67 or lens and mirror assembly second guide 68.

In a first configuration of multi-direction optical data port 60, shown to advantage in FIGS. 8 and 9, lens and mirror assembly 61 is slideably engaged within opening 206 from front 204. As lens and mirror assembly 61 advances into opening 206 as shown, stationary pin 66 engages lens and mirror assembly first guide 67 and the front edge of mirror 63 causing mirror 63 to pivot on top spring hinge 64 and bottom spring hinge 65 towards and flush against front 204. In this position, mirror 63 is pivoted clearly out of the path of light signals allowing optical data transfer from side 205 of image forming device 200 through lens panel 73.

In a second configuration of multi-direction optical data port 60, shown to advantage in FIGS. 10 and 11, lens and mirror assembly 61 is slideably engaged within opening 206 from side 205. As lens and mirror assembly 61 advances into opening 206 as shown, stationary pin 66 engages lens and mirror assembly second guide 68. However, in this second configuration, stationary pin 66 does not engage mirror 63 until lens and mirror assembly 61 is fully engaged within opening 206. As lens and mirror assembly 61 advances into opening 206 as shown, rear edge of mirror 63 is forced against stationary pin 66 pressuring mirror 63 against mirror stop 69. In this manner, mirror 63 is positioned securely between stationary pin 66 and mirror stop 69 parallel to the axis of symmetry, AX, and within the path of serial infra-red signals allowing optical data transfer from front 204 of image forming device 200 through lens panel 73.

As can be seen from the foregoing description, and figures, placement of stationary pin 66 relative to lens and mirror assembly first guide 67 and lens and mirror assembly second guide 68 is important as, in the first configuration of multi-direction optical data port 60, shown to advantage in FIGS. 8 and 9, lens and mirror assembly 61 is slideably engaged within opening 206 from front 204 and lens and mirror assembly first guide 67 must engage stationary pin 66. Similarly, in the second configuration of multi-direction optical data port 60, shown to advantage in FIGS. 10 and 11 lens and mirror assembly second guide 68 is slideably engaged within opening 206 from side 205 and must engage stationary pin 66.

It should now be apparent that other mirror translation schemes can be employed to position a mirror in and out of the light path of optical transducer 12 including mechanical and electromechanical translation assemblies.

While there is shown and described the preferred embodiments of the invention, it is to be distinctly understood that this invention is not limited thereto but may be variously embodied to practice within the scope of the following claims. It will therefore be understood that modifications and variations are possible without departing from the scope of the invention as expressed in the following claims.

We claim:

1. An optical system to provide alternate data transfer directions which comprises:

an infrared optical data port having a predefined light path;

a lens panel; and a mirror panel positionable between at least first and second positions where the first position has the mirror panel positioned out of the light path so as not to interfere with incoming or out going light and the second position has the mirror panel positioned in the light path to reflect and thereby redirect incoming or out going light.

2. A lens assembly for use with an optical data port having a predefined light path to provide alternate data transfer directions which comprises:

a lens panel;

a mirror panel positionable between at least first and second positions where the first position has the mirror panel positioned out of the light path so as not to interfere with incoming or out going light and the second position has the mirror panel positioned in the light path to reflect and thereby redirect incoming or out going light; and a side panel being attached to the lens panel and the mirror panel being attached to the side panel.

3. The lens assembly of claim 2 wherein the lens and side panels are configured and positioned symmetrically about a central axis, defined as the axis of symmetry, and switching of data transfer directions is accomplished by a 180° rotation of the lens assembly about the axis of symmetry.

4. A lens assembly for use with an optical data port having a predefined light path to provide alternate data transfer directions which comprises:

a lens panel;

a mirror panel positionable between at least first and second positions where the first position has the mirror panel positioned out of the light path so as not to interfere with incoming or out going light and the second position has the mirror panel positioned in the light path to reflect and thereby redirect incoming or out going light;

a second lens panel;

the first lens panel being positioned within the light path and substantially perpendicular to a first data transfer direction;

the mirror panel being movably mounted with respect to the lens panels between the first and second positions; and the second lens panel being positioned substantially perpendicular to a second data transfer direction and in the redirected light path.

5. An optical data port having alternate data transfer directions which comprises:

an infrared optical transducer module having a predefined light path for transmitting data;

a mirror panel positionable between at least first and second positions where the first position has the mirror panel positioned out of the light path so as not to interfere with incoming or out going light and the second position has the mirror panel positioned in the light path to reflect and thereby redirect incoming or out going light; and a lens panel positionable within the predefined light path or the redirected light path.

6. An optical data port having alternate data transfer directions which comprises:

an optical transducer module having a predefined light path for transmitting data;

a mirror panel positionable between at least first and second positions where the first position has the mirror panel positioned out of the light path so as not to interfere with incoming or out going light and the second position has the mirror panel positioned in the light path to reflect and thereby redirect incoming or out going light;

a lens panel positionable within the predefined light path or the redirected light path; and a side panel being attached to the lens panel and the mirror panel being attached to the side panel.

7. The optical data port of claim 6 wherein the lens and side panels are configured and positioned symmetrically about a central axis, defined as the axis of symmetry, and switching of data transfer directions is accomplished by a 180° rotation of the lens assembly about the axis of symmetry.

8. An optical data port having alternate data transfer directions which comprises:

an optical transducer module having a predefined light path for transmitting data;

a mirror panel positionable between at least first and second positions where the first position has the mirror panel positioned out of the light path so as not to interfere with incoming or out going light and the second position has the mirror panel positioned in the light path to reflect and thereby redirect incoming or out going light;

a lens panel positionable within the predefined light path or the redirected light path; and a second lens panel;

the first lens panel being positioned within the light path and substantially perpendicular to a first data transfer direction;

the mirror panel being movably mounted with respect to the lens panels between the first and second positions; and the second lens panel being positioned substantially perpendicular to a second data transfer direction and in the redirected light path.

9. An image forming device which comprises:

a housing;

a print engine contained within the housing for printing data on a print medium;

an optical data port positioned to transmit data through the housing and in data communication with the print engine, the optical data port having alternate data transfer directions and including:

an optical transducer module having a predefined light path for transmitting data;

a mirror panel positionable between at least first and second positions where the first position has the mirror panel positioned out of the light path so as not to interfere with incoming or out going light and the second position has the mirror panel positioned in the light path to reflect and thereby redirect incoming or out going light; and a lens panel positionable within the predefined light path or the redirected light path.

10. The image forming device of claim 9 further comprising a side panel being attached to the lens panel and the mirror panel being attached to the side panel.

11. The image forming device of claim 10 wherein the lens and side panels are configured and positioned symmetrically about a central axis, defined as the axis of symmetry, and switching of data transfer directions is accomplished by a 180° rotation of the lens assembly about the axis of symmetry.

12. The image forming device of claim 9 further comprising:

a second lens panel;

the first said lens panel being positioned within the light path and substantially perpendicular to a first data transfer direction;

the mirror panel being movably mounted with respect to the lens panels between the first and second positions; and the second lens panel being positioned substantially perpendicular to a second data transfer direction and in the redirected light path.

* * * * *